(12) United States Patent
Liu (10) Patent No.: US 12,044,266 B1
(45) Date of Patent: Jul. 23, 2024

(54) APPARATUS FOR ANTI-LOOSENING JOINTS

(71) Applicant: Wei Liu, Arlington, TN (US)

(72) Inventor: Wei Liu, Arlington, TN (US)

( * ) Notice: Subject to any disclaimer, the term of this patent is extended or adjusted under 35 U.S.C. 154(b) by 265 days.

(21) Appl. No.: 17/690,004

(22) Filed: Mar. 9, 2022

(51) Int. Cl.
*F16B 39/282* (2006.01)
*F16B 39/12* (2006.01)

(52) U.S. Cl.
CPC ............ *F16B 39/282* (2013.01); *F16B 39/12* (2013.01)

(58) Field of Classification Search
CPC .......... F16B 39/06; F16B 39/08; F16B 39/10; F16B 39/12; F16B 39/282; Y10S 411/924; Y10S 411/939; Y10S 411/948
USPC ........ 411/190, 191, 204, 216–220, 221, 292, 411/321, 432, 929
See application file for complete search history.

(56) References Cited

U.S. PATENT DOCUMENTS

| | | | | |
|---|---|---|---|---|
| 461,678 A * | 10/1891 | Gross | ...................... | F16B 39/06 411/925 |
| 467,617 A * | 1/1892 | Gross | ...................... | F16B 39/108 411/948 |
| 573,044 A * | 12/1896 | Seely | ...................... | F16B 39/10 411/204 |
| 901,875 A * | 10/1908 | Burton | ...................... | F16B 39/06 411/944 |
| 922,543 A * | 5/1909 | Truston | ...................... | F16B 39/32 411/923 |
| 1,010,109 A * | 11/1911 | Badger | ...................... | F16B 39/06 168/41 |
| 1,219,780 A * | 3/1917 | Rohrheimer | ............ | F16B 39/32 403/358 |
| 1,448,178 A * | 3/1923 | Andrix | ...................... | F16B 39/08 411/948 |
| 1,552,681 A * | 9/1925 | Davis | ...................... | F16B 39/10 411/944 |
| 2,367,399 A * | 1/1945 | Stig | ......................... | F16B 39/06 411/277 |
| 3,382,905 A * | 5/1968 | Gutshall | ................. | F16B 39/08 411/946 |
| 5,395,192 A * | 3/1995 | Bennett | ................... | F16B 39/10 411/203 |
| 6,071,052 A | 6/2000 | Kerr | | |
| 2010/0183399 A1 | 7/2010 | Suga | | |

* cited by examiner

Primary Examiner — Roberta S Delisle (57) ABSTRACT

This invention is an apparatus of bolt and nut for anti-loosening joints by using a variety of mechanisms to grip the shank of said bolt and simultaneously to grab onto said nut in order to prevent said nut from turning loose.

21 Claims, 11 Drawing Sheets

Figure 11

APPARATUS FOR ANTI-LOOSENING JOINTS

CROSS-REFERENCE TO RELATED APPLICATIONS

None

STATEMENT REGARDING FEDERALLY SPONSORED RESEARCH OR DEVELOPMENT

This is solely my personal invention and is not made with or related to any federal funding.

REFERENCE TO A "SEQUENCE LISTING"

None

BACKGROUND OF THE INVENTION

In virtually all aspects of industrial manufacturing and construction, joining of plurality of parts is widely needed. However, the environment in which said joining takes place may be less than desirable, such as a condition with constant vibrations. As vibrations increase the possibility of loosening tightened bolts and nuts, various designs and methods have been created and applied, e.g., serrated washers, wedge-lock washers, and castellated nuts. These designs and many others offer their utility in a great number of applications. However, they have their limitations and disadvantages. For instance, serrated washers cannot be tightened too much, since too much pressure will flatten said serrated washers which will lose their anti-loosening ability and will become ordinary washers in practical terms. Wedge-lock washers offer great anti-loosening resistance, but they cannot be used to join parts with extremely hard surfaces, due to the fact that the grooves on said wedge-lock washers cannot "bite" into said extremely hard surfaces. Castellated nuts provide the desired capability to hold the load while preventing any loosening of the joint. Nevertheless, installation of said castellated nuts requires a significant amount of manual work and plenty space around said joint for a drill to be used to drill a hole in the bolt. Moreover, it is difficult to make the inserted wire pin fit snugly into the slots of said castellated nut, which would allow said castellated nut to turn backward slightly and reduce the grip of said castellated nut on the joint. Other types of self-tightening nuts have also been invented, such as King Nut design developed by Izushi of Japan. Said King Nut design involves a guide ring over a nut, which inevitably means more manufacturing efforts and higher production cost. Some efforts have also been made to patent some anti-loosening joints, such as patent application (WO2013191376A1. Application PCT/KR2013/004170) and patent application (CN104454913A. Application CN201410728584.4A). These patent applications either involve a complicated nut design or complicated thread pattern on the bolt.

BRIEF SUMMARY OF THE INVENTION

This invention is an apparatus of bolt and nut for anti-loosening joints by using a variety of mechanisms to grip the shank of said bolt and simultaneously to grab onto said nut in order to prevent said nut from turning loose.

BRIEF DESCRIPTION OF DRAWINGS

It is important to note that the contents in the figures listed above are meant to clearly illustrate this invention, its functioning, and its components and parameters, and thus may not be necessarily proportional or true to scale.

DETAILED DESCRIPTION OF THE INVENTION

As for the anti-loosening joints in this invention, three design approaches are explained below.

First Design Approach (claims 1-7)

Figure 1:
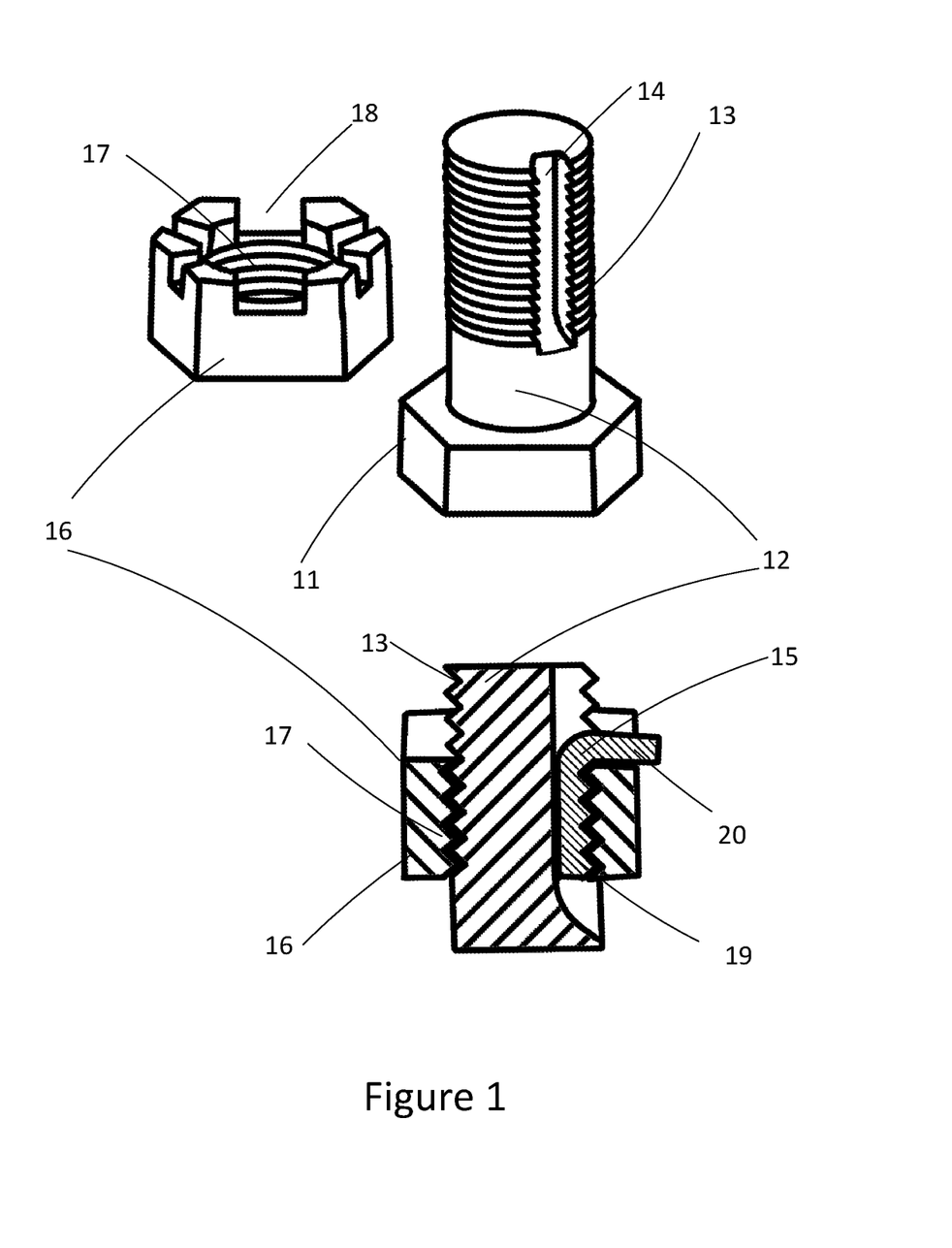
FIG. 1 explains the functioning of a design using a nut with at least one slot and an elongated filler pin with thread-locking means and nut-locking means.

FIG. 1 shows the functioning of a design that comprises (a) a bolt 11 (FIG. 1) having a shank 12 (FIG. 1) with male thread 13 (FIG. 1) and pin-groove means 14 (FIG. 1) for securing a filler pin, (b) at least one elongated filler pin of predetermined dimensions 15 (FIG. 1), and (c) a nut 16 (FIG. 1) that may comprise at least one flat face, a female thread 17 (FIG. 1) compatible with said male thread 13 (FIG. 1), and at least one slot 18 (FIG. 1). As shown in FIG. 1, said pin-groove means comprises at least one longitudinal groove 14 (FIG. 1) on said shank 12 (FIG. 1). Said at least one elongated filler pin 15 (FIG. 1) fits into said at least one longitudinal groove 14 (FIG. 1) to geometrically form a substantially circular cross section of said shank 12 (FIG. 1), and thus said at least one elongated filler pin 15 (FIG. 1) will not move on said shank 12 (FIG. 1). Further, said at least one elongated filler pin 15 (FIG. 1) comprises thread-locking means 19 (FIG. 1) for attaching to said female thread 17 (FIG. 1) and also nut-locking means 20 (FIG. 1) for attaching to said at least one slot 18 (FIG. 1). Moreover, said at least one elongated filler pin 15 (FIG. 1) is bendable and able to retain its bended shape. As shown in FIG. 1, said thread-locking means 19 (FIG. 1) of said at least one elongated filler pin 15 (FIG. 1) comprises the same of said male thread 13 (FIG. 1) to mate with said female thread 17 (FIG. 1) of said nut 16 (FIG. 1). And said nut-locking means 20 (FIG. 1) comprises a part of said at least one elongated filler pin 15 (FIG. 1) that is bent to fit into said at least one slot 18 (FIG. 1) of said nut 16 (FIG. 1).

Figure 2:
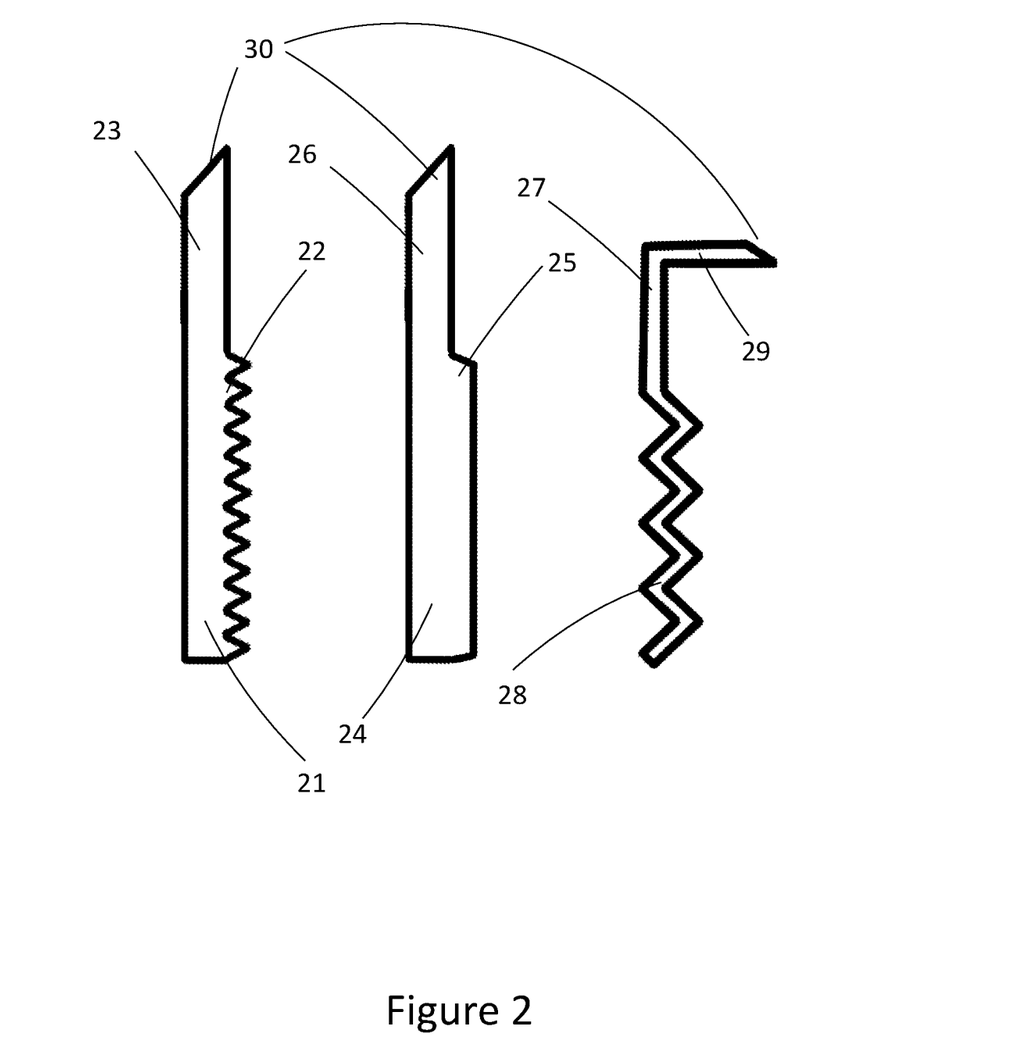
FIG. 2 illustrates three viable design options of an elongated filler pin.

FIG. 2 illustrates three viable designs options of said at least one elongated filler pin 15 (FIG. 1). In the first design option (left drawing), the thread-locking means 22 (FIG. 2) of said at least one elongated filler pin 21 (FIG. 2) comprises a section that is pre-threaded with the same of said male thread 13 (FIG. 1), while said nut-locking means 23 (FIG. 2) comprises a part of said at least one elongated filler pin 21 (FIG. 2) (the top end thereof in this case) that is bendable and able to retain its bended shape in said at least one slot 18 (FIG. 1) of said nut 16 (FIG. 1) and may also comprise an optional bevel 30 (FIG. 2) to help bend itself when pushed downward. Said at least one elongated filler pin 21 (FIG. 2) is inserted in said at least one longitudinal groove 14 (FIG. 1) before said nut 16 (FIG. 1) is screwed on. In the second design option (middle drawing), said at least one elongated filler pin 24 (FIG. 2) or said thread-locking means 25 (FIG. 2) thereof comprises a predetermined material of predetermined malleability to be threaded by said nut 16 (FIG. 1) when said nut 16 (FIG. 1) is torqued into said shank 12 (FIG. 1). The nut-locking means 26 (FIG. 2) of said at least one elongated filler pin 24 (FIG. 2) comprises a part of said at least one elongated filler pin 24 (FIG. 2) (the top end thereof in this case) that is bendable and able to retain its bended shape in said at least one slot 18 (FIG. 1) of said nut 16 (FIG. 1) and may also comprise an optional bevel 30 (FIG. 2) to help bend itself when pushed downward. Said at least one elongated filler pin 24 (FIG. 2) is inserted in said at least one longitudinal groove 14 (FIG. 1) before said nut 16 (FIG. 1) is screwed on. In the third design option (right drawing), the thread-locking means 28 (FIG. 2) of said at least one elongated filler pin 27 (FIG. 2) comprises a zig-zag structure of predetermined dimensions and predetermined elasticity. With its predetermined dimensions and predetermined elasticity, preferably said zig-zag structure 27 (FIG. 2) fits in said at least one longitudinal groove 14 (FIG. 1) to geometrically form a substantially circular cross section of said shank 12 (FIG. 1), so that said zig-zag structure 27 (FIG. 2) easily grabs hold of said female thread 17 (FIG. 1). It is important to note that the dimensions of said zig-zag structure 27 (FIG. 2) can be somewhat different from what is exactly needed to geometrically form a circular cross section of said shank 12 (FIG. 1) thanks to its predetermined dimensions and predetermined elasticity, in order to grab hold of said female thread 17 (FIG. 1). The nut-locking means 29 (FIG. 2) comprises a part of said at least one elongated filler pin 27 (FIG. 2) (the top end thereof in this case) that is pre-bent or is bendable and able to retain its bended shape in said at least one slot 18 (FIG. 1) of said nut 16 (FIG. 1). With a part of said at least one elongated filler pin 27 (FIG. 2) or said top end 29 (FIG. 2) thereof bended beforehand (as shown in FIG. 2), said at least one elongated filler pin 27 (FIG. 2) can be inserted in said at least one longitudinal groove 14 (FIG. 1) after said nut 16 (FIG. 1) is screwed on thanks to said predetermined elasticity, and said part of said at least one elongated filler pin 27 (FIG. 2) or said top end 29 (FIG. 2) thereof fits into said at least one slot 18 (FIG. 1). Alternatively, said at least one elongated filler pin 27 (FIG. 2) can be inserted in said at least one longitudinal groove 14 (FIG. 1) before said nut 16 (FIG. 1) is screwed on and a part of said at least one elongated filler pin 27 (FIG. 2) or said top end 29 (FIG. 2) thereof is then bent into said at least one slot 18 (FIG. 1) on said nut 16 (FIG. 1) after said nut 16 (FIG. 1) is screwed on and. Said part of said at least one elongated filler pin 27 (FIG. 2) or said top end 29 (FIG. 2) thereof may also comprise an optional bevel 30 (FIG. 2) to help bend itself when pushed downward.

Figure 3:
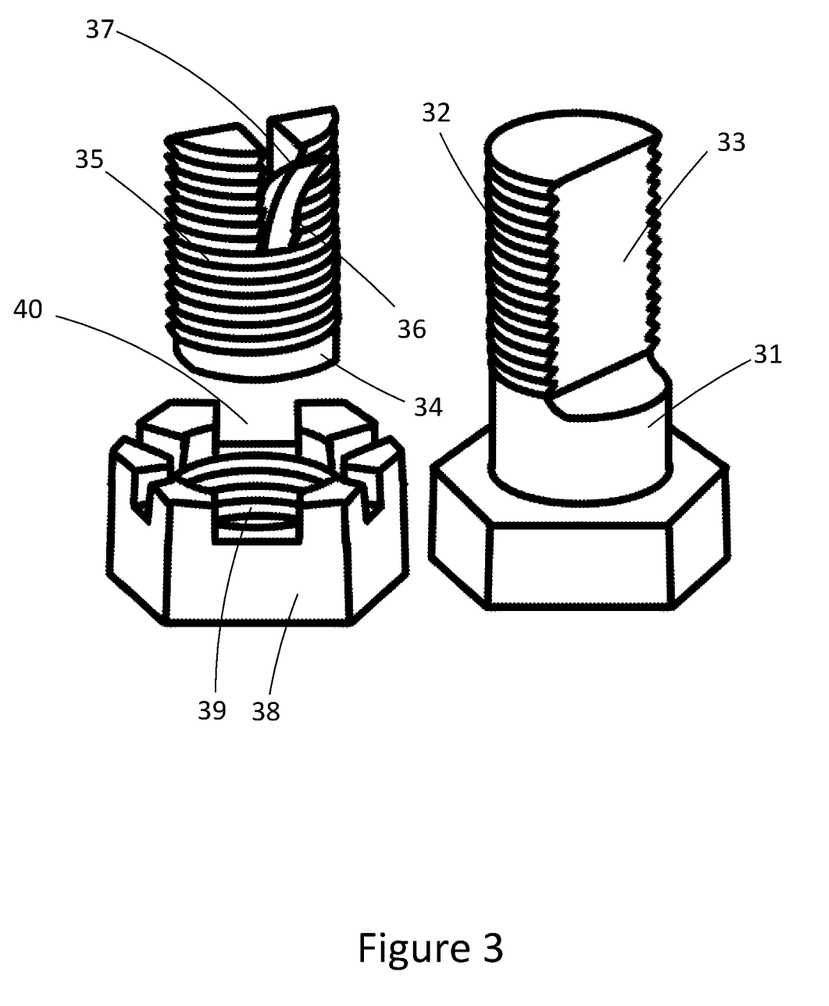
FIG. 3 displays an alternative design option of an elongated filler pin with thread-locking means and nut-locking means.

FIG. 3 displays an alternative option of said first design approach in which said pin-groove means 33 (FIG. 3) assumes the shape of a cutout section on said shank 31 (FIG. 3), rather than said at least one longitudinal groove 14 (FIG. 1) mentioned previously. Said at least one elongated filler pin 34 (FIG. 3) comprises a structure that fits into said pin-groove means 33 (FIG. 3) to geometrically form a substantially circular cross section of said shank 31 (FIG. 3) and also said thread-locking means 35 (FIG. 3) comprises the same of said male thread 32 (FIG. 3) to mate with said female thread 39 (FIG. 3) of said nut 38 (FIG. 3). As in the second design option (middle drawing) of FIG. 2, said at least one elongated filler pin 34 (FIG. 3) or said thread-locking means 35 (FIG. 3) thereof can also comprise a predetermined material of predetermined malleability to be threaded by said nut 38 (FIG. 3) when said nut 38 (FIG. 3) is torqued into said shank 31 (FIG. 3). A part of said at least one elongated filler pin 34 (FIG. 3) is bendable and able to retain its bended shape to fit into said at least one slot 40 (FIG. 3) of said nut 38 (FIG. 3). As shown in FIG. 3, one part 36 (FIG. 3) of said at least one elongated filler pin 34 (FIG. 3) is bended and also comprises an optional bevel 37 (FIG. 3) to help bend itself when pushed downward.

Second Design Approach (claims 8-10)

Figure 4:
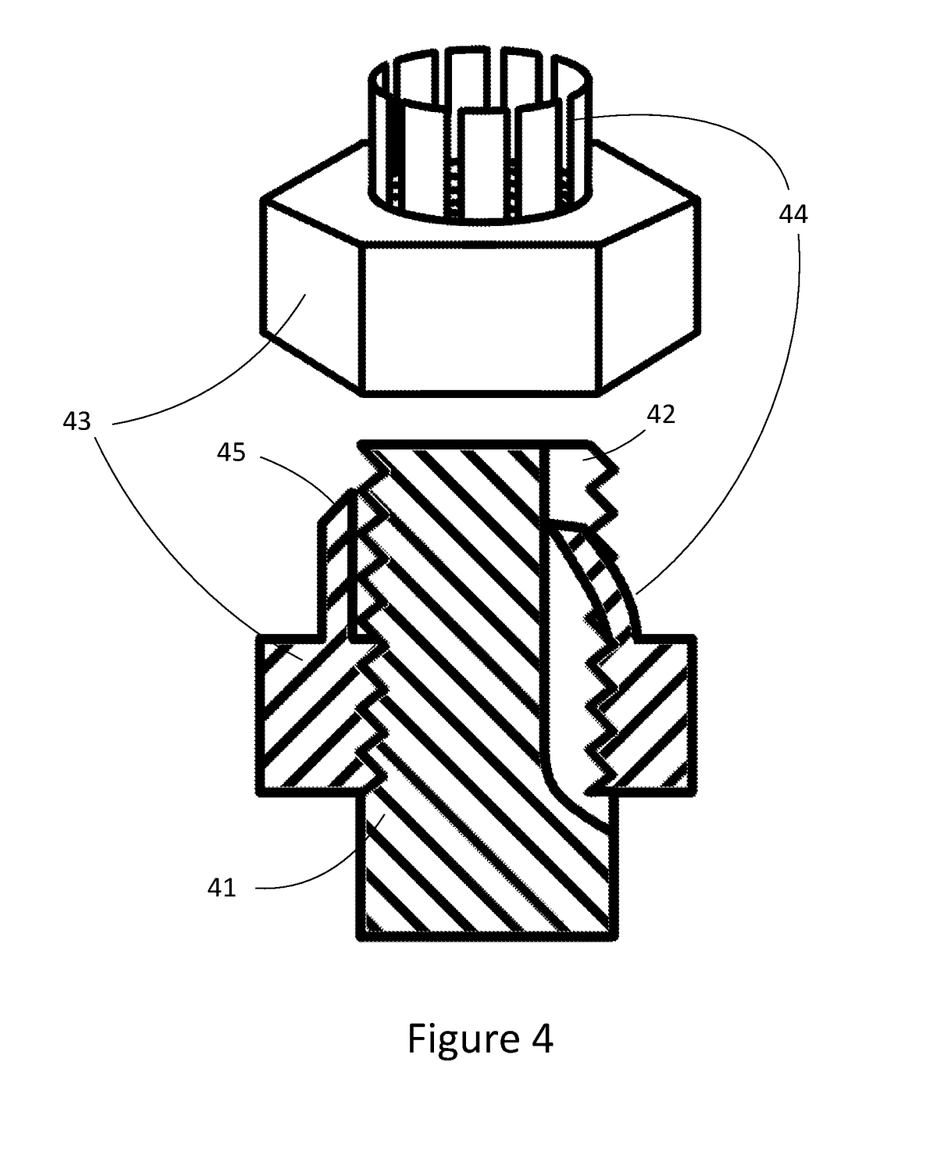
FIG. 4 demonstrates the functioning of a design using a nut with groove-locking means to grip into at least one longitudinal groove on a bolt.

FIG. 4 demonstrates the functioning of a design of a nut 43 (FIG. 4) that comprises groove-locking means 44 (FIG. 4) for attaching to shank-groove means 42 (FIG. 4) on said shank 41 (FIG. 4). As shown in FIG. 4, said shank-groove means comprises at least one longitudinal groove 42 (FIG. 4) on the shank 41 (FIG. 4). Said groove-locking means 44 (FIG. 4) comprises at least one flap of predetermined dimensions, and further said at least one flap 44 (FIG. 4) is bendable and able to retain its bended shape in said at least one longitudinal groove 42 (FIG. 4). Once said nut 43 (FIG. 4) is screwed on said shank 41 (FIG. 4), said at least one flap 44 (FIG. 4) is bent into said at least one longitudinal groove 42 (FIG. 4) to prevent said nut 43 (FIG. 4) from moving on said shank 41 (FIG. 4). Additionally, said at least one flap 44 (FIG. 4) may also comprise an optional bevel 45 (FIG. 4) to help bend itself when pushed downward.

Third Design Approach (claims 11-25)

Figure 5:
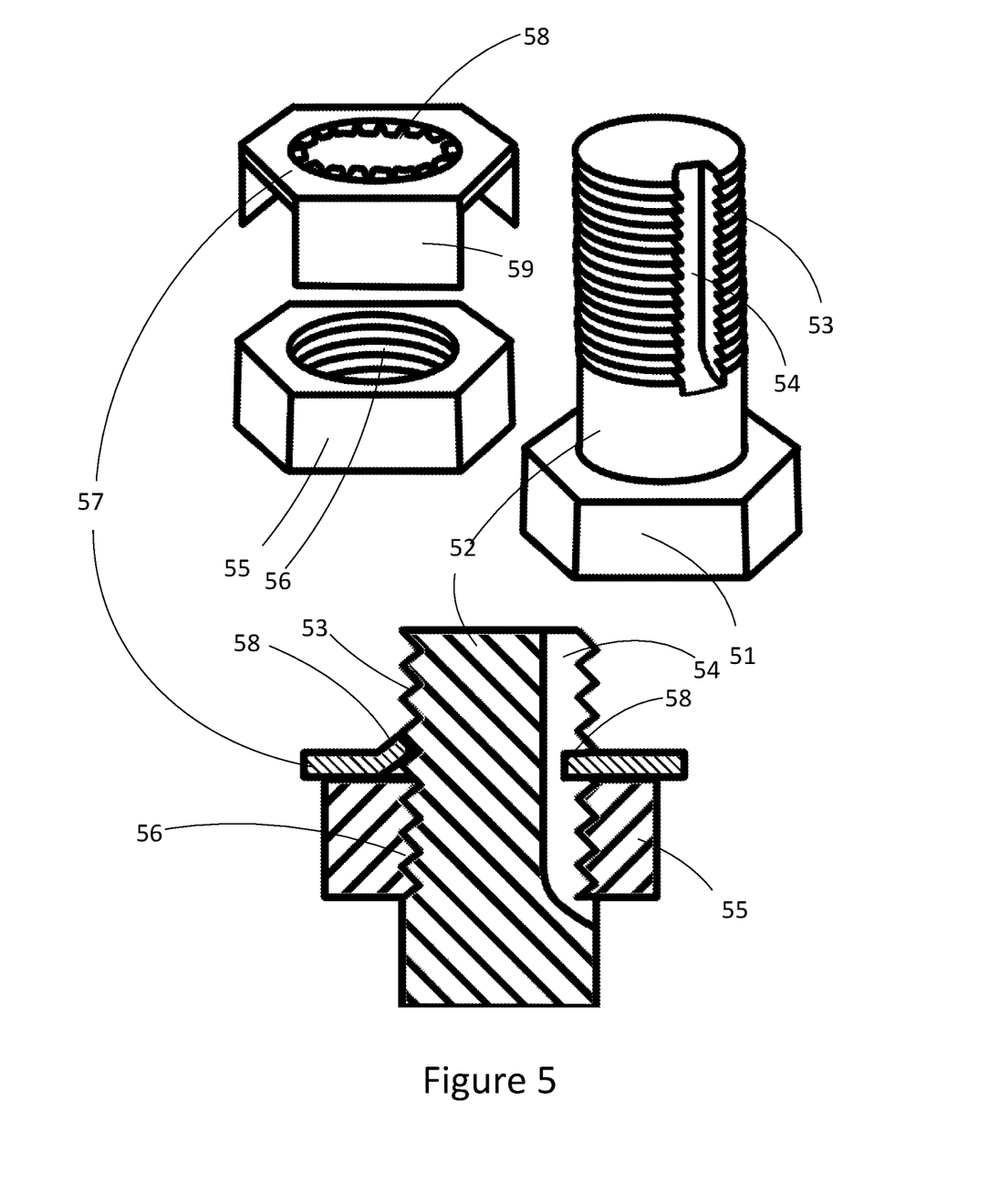
FIG. 5 explains the functioning of a design using a security washer with shank-locking means and nut-gripping means in the form of a pre-formed structure.

FIG. 5 demonstrates the functioning of a design that comprises (a) a bolt 51 (FIG. 5) having a shank 52 (FIG. 5) with a male thread 53 (FIG. 5) and washer-groove means 54 (FIG. 5), (b) a nut 55 (FIG. 5) with a female thread 56 (FIG. 5) compatible with said male thread 53 (FIG. 5) and at least one flat face, and (c) a security washer 57 (FIG. 5) with shank-locking means 58 (FIG. 5) for attaching to said shank 52 (FIG. 5) and nut-gripping means 59 (FIG. 5) for attaching to said nut 55 (FIG. 5). As shown in FIG. 5, said washer-groove means comprises at least one longitudinal groove 54 (FIG. 5) on said shank 52 (FIG. 5). Said shank-locking means comprise a serrated inner opening 58 (FIG. 5) that is smaller in diameter than said shank 52 (FIG. 5) by a predetermined margin and has predetermined elasticity. Said nut-gripping means comprises a pre-formed structure 59 (FIG. 5) of predetermined dimensions to fit closely at least one flat face of said nut 55 (FIG. 5). Once said nut 55 (FIG. 5) is screwed on said shank 52 (FIG. 5) and said security washer 57 (FIG. 5) is pushed down said shank 52 (FIG. 5) onto said nut 55 (FIG. 5), said serrated inner opening 58 (FIG. 5) unidirectionally grabs hold of said male thread 53 (FIG. 5) with a part of said serrated inner opening 58 (FIG. 5) gripping into said at least one longitudinal groove 54 (FIG. 5) to prevent said security washer 57 (FIG. 5) from moving on said shank 52 (FIG. 5). At the same time, said pre-formed structure 59 (FIG. 5) fits closely said at least one flat face of said nut 55 (FIG. 5) to prevent said nut 55 (FIG. 5) from moving on said shank 52 (FIG. 5).

Figure 6:
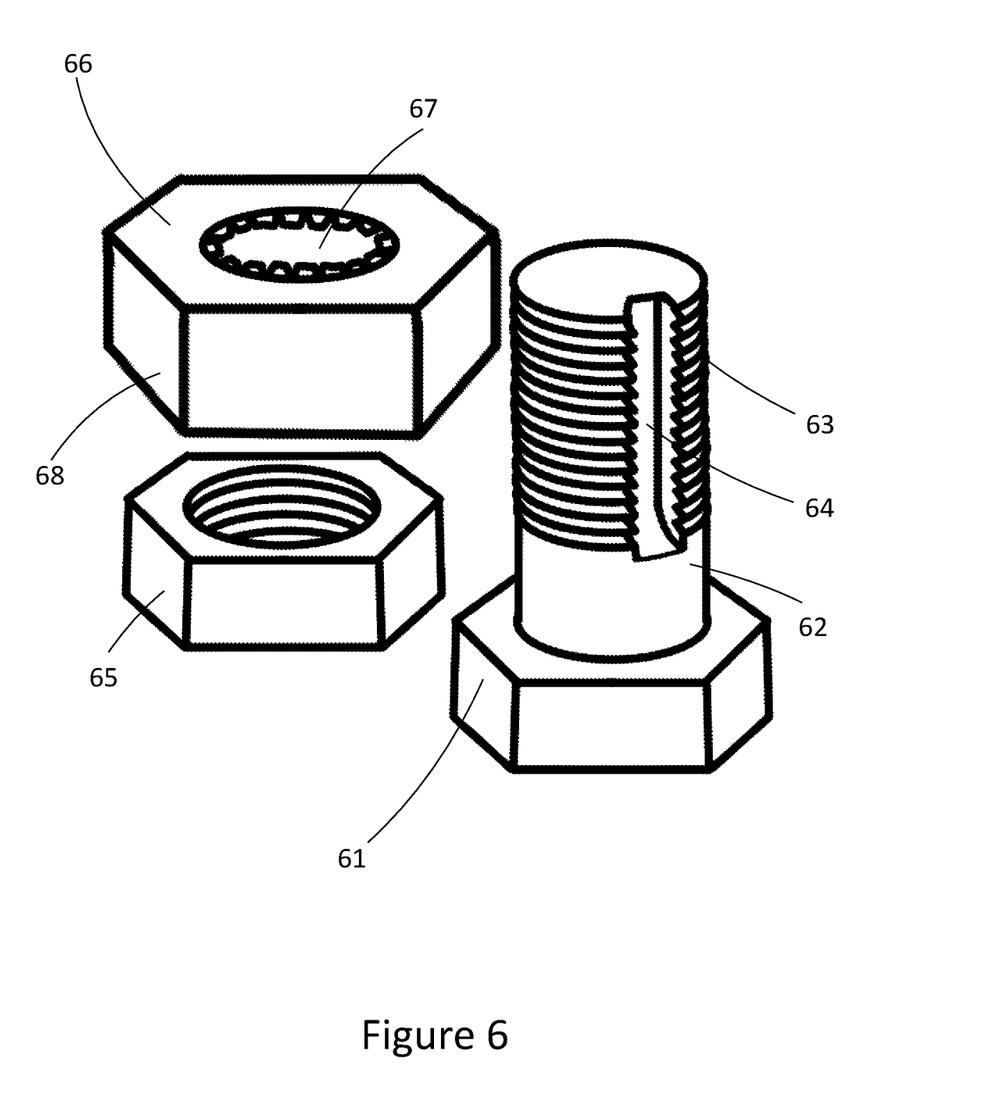
FIG. 6 shows a design option of a security washer with shank-locking means and nut-gripping means in the form of a pre-formed sleeve.

Many other viable design options for said security washer also exist, including design options that are described in the following figures. The same functioning of said shank-locking means remains valid and applicable and thus will not be elaborated graphically in as many details as in FIG. 5. FIG. 6 shows a security washer design option in which said nut-gripping means comprises a pre-formed sleeve 68 (FIG. 6) of predetermined dimensions to encompass snugly said nut 65 (FIG. 6), and said shank-locking means comprise a serrated inner opening 67 (FIG. 6) that is smaller in diameter than said shank 62 (FIG. 6) by a predetermined margin and comprises predetermined elasticity. When said nut 65 (FIG. 6) is screwed onto said shank 62 (FIG. 6) on said bolt 61 (FIG. 6), said security washer 66 (FIG. 6) is pushed down said shank 62 (FIG. 6) onto said nut 65 (FIG. 6). As described previously, said serrated inner opening 67 (FIG. 6) unidirectionally grabs hold of said male thread 63 (FIG. 6) with a part of said serrated inner opening 67 (FIG. 6) gripping into said at least one longitudinal groove 64 (FIG. 6) to prevent said security washer 66 (FIG. 6) from moving on said shank 62 (FIG. 6). Furthermore, said pre-formed sleeve 68 (FIG. 6) encompasses snugly said nut 65 (FIG. 6) to prevent said nut 65 (FIG. 6) from moving.

Figure 7:
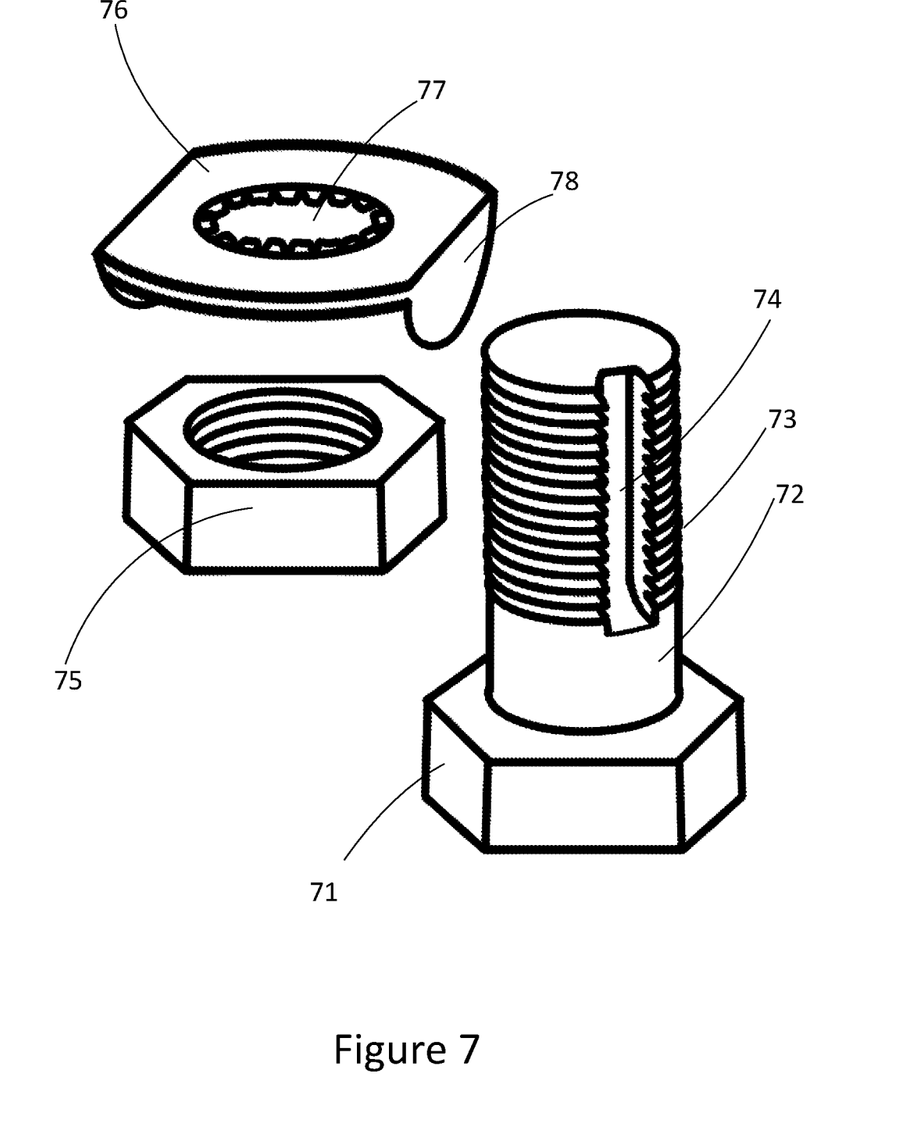
FIG. 7 exhibits a design option of a security washer with shank-locking means and nut-gripping means in the form of an outer flange.

FIG. 7 illustrates a security washer design option in which said nut-gripping means comprises an outer flange 78 (FIG. 7) of predetermined dimensions and said outer flange is bendable and able to retain its bended shape, and said shank-locking means comprise a serrated inner opening 77 (FIG. 7) that is smaller in diameter than said shank 72 (FIG. 7) by a predetermined margin and has predetermined elasticity. Said outer flange 78 (FIG. 7) could be substantially larger in diameter than said nut 72 (FIG. 7) by a predetermined margin to facilitate easy bending. When said nut 75 (FIG. 7) is screwed onto said shank 72 (FIG. 7) of said bolt 71 (FIG. 7), said security washer 76 (FIG. 7) is pushed down said shank 72 (FIG. 7) onto said nut 75 (FIG. 7). As described previously, said serrated inner opening 77 (FIG. 7) unidirectionally grabs hold of said male thread 73 (FIG. 7) with a part of said serrated inner opening 77 (FIG. 7) gripping into said at least one longitudinal groove 74 (FIG. 7) to prevent said security washer 76 (FIG. 7) from moving on said shank 72 (FIG. 7). Said outer flange 78 (FIG. 7) is bended to press onto said nut 75 (FIG. 7) to prevent said nut 75 (FIG. 7) from moving.

Figure 8:
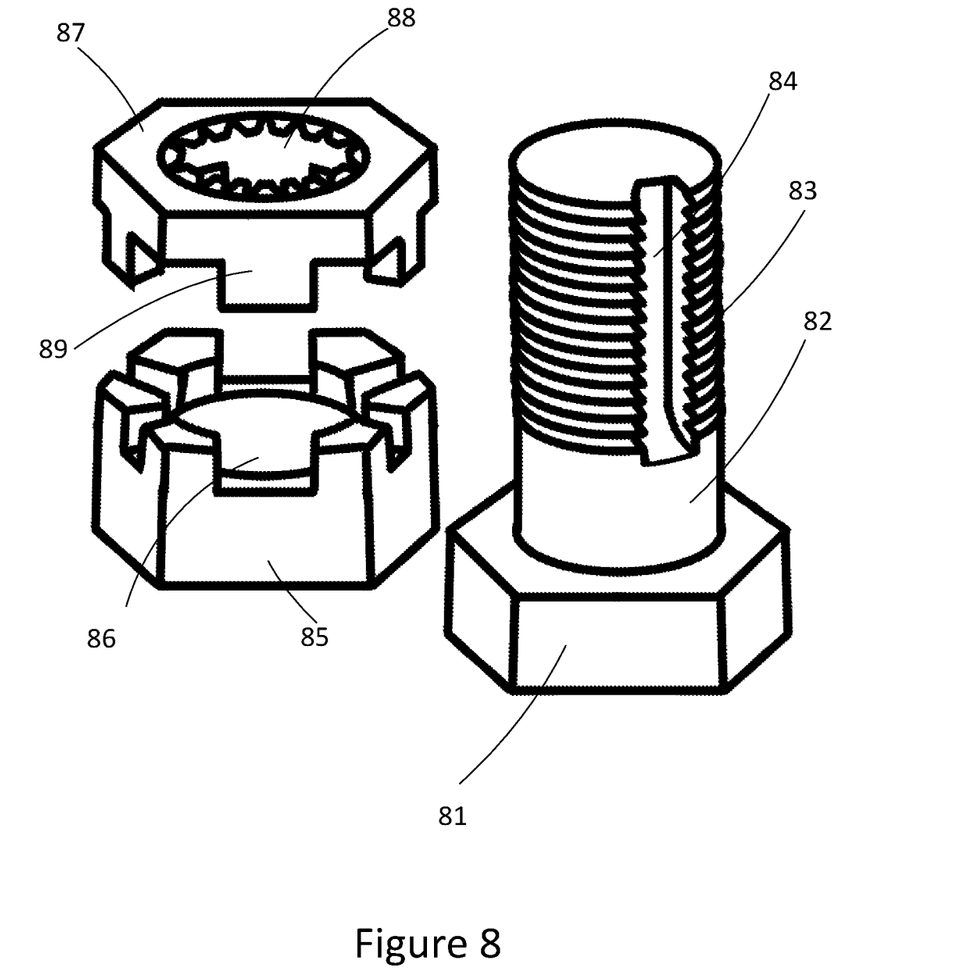
FIG. 8 displays a design option of a security washer with shank-locking means and nut-gripping means in the form of at least one protruding ridge.

FIG. 8 describes a security washer design option in which said nut 85 (FIG. 8) comprises at least one slot 86 (FIG. 8). Said nut-gripping means on said security washer 87 (FIG. 8) comprises at least one protruding ridge 89 (FIG. 8) that meshes into said at least one slot 86 (FIG. 8) on said nut 85 (FIG. 8). Said shank-locking means on said security washer 87 (FIG. 8) comprise a serrated inner opening 88 (FIG. 8) that is smaller in diameter than said shank 82 (FIG. 8) by a predetermined margin and has predetermined elasticity. When said nut 85 (FIG. 8) is screwed onto said shank 82 (FIG. 8) of said bolt 81 (FIG. 8), said security washer 87 (FIG. 8) is pushed down said shank 82 (FIG. 8) onto said nut 85 (FIG. 8). As described previously, said serrated inner opening 88 (FIG. 8) unidirectionally grabs hold of said male thread 83 (FIG. 8) with a part of said serrated inner opening 88 (FIG. 8) gripping into said at least one longitudinal groove 84 (FIG. 8) to prevent said security washer 87 (FIG. 8) from moving on said shank 82 (FIG. 8). Said at least one protruding ridge 89 (FIG. 8) meshes into said at least one slot 86 (FIG. 8) on said nut 85 (FIG. 8) to prevent said nut 85 (FIG. 8) from moving.

Figure 9:
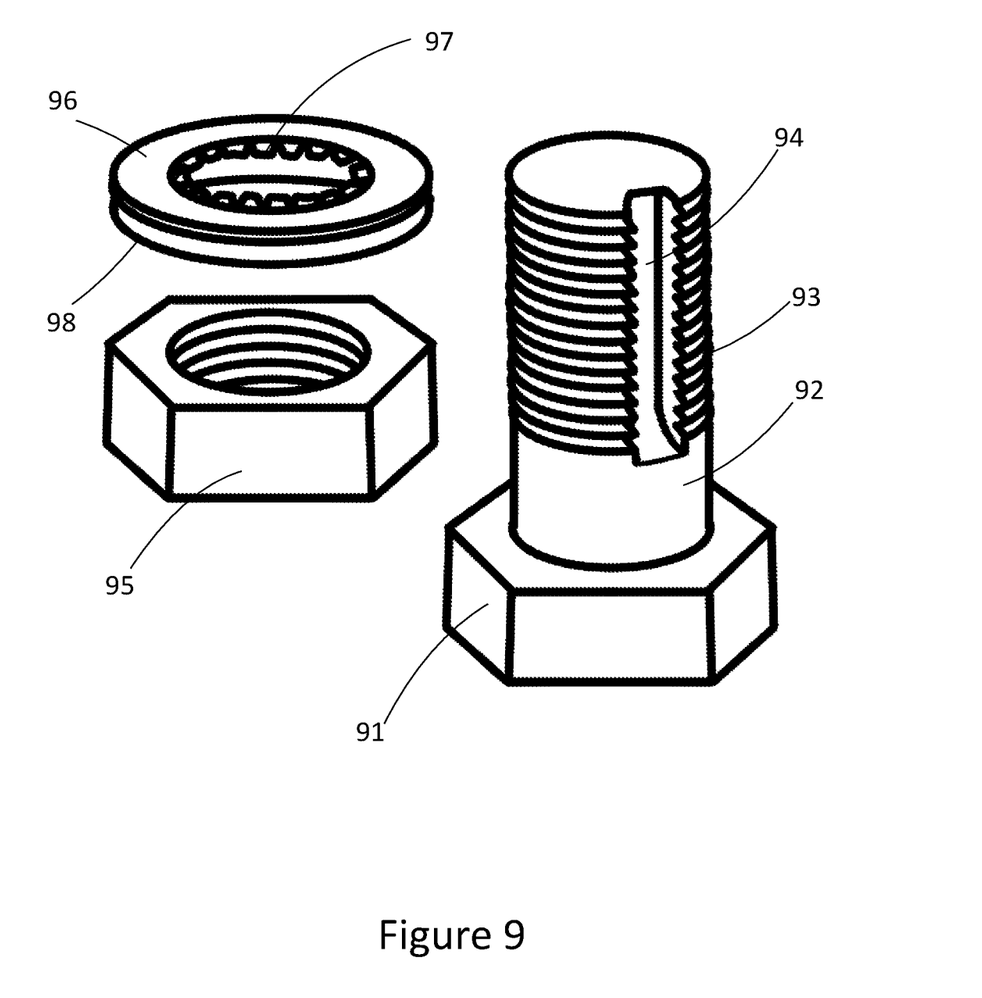
FIG. 9 describes a design option of a security washer with shank-locking means and nut-gripping means in the form of a glue interface.

FIG. 9 displays a security washer design option in which said nut-gripping means comprises a glue interface 98 (FIG. 9) of predetermined dimensions, and said shank-locking means comprise a serrated inner opening 97 (FIG. 9) that is smaller in diameter than said shank 92 (FIG. 9) by a predetermined margin and has predetermined elasticity. When said nut 95 (FIG. 9) is screwed onto said shank 92 (FIG. 9) of said bolt 91 (FIG. 9), said security washer 96 (FIG. 9) is pushed down said shank 92 (FIG. 9) onto said nut 95 (FIG. 9). As described previously, said serrated inner opening 97 (FIG. 9) unidirectionally grabs hold of said male thread 93 (FIG. 9) with a part of said serrated inner opening 97 (FIG. 9) gripping into said at least one longitudinal groove 94 (FIG. 9) to prevent said security washer 96 (FIG. 9) from moving on said shank 92 (FIG. 9). Said glue interface 98 (FIG. 9) is pressed onto said nut 95 (FIG. 9) and securely sticks to said nut 95 (FIG. 9) to prevent said nut 95 (FIG. 9) from moving.

Figure 10:
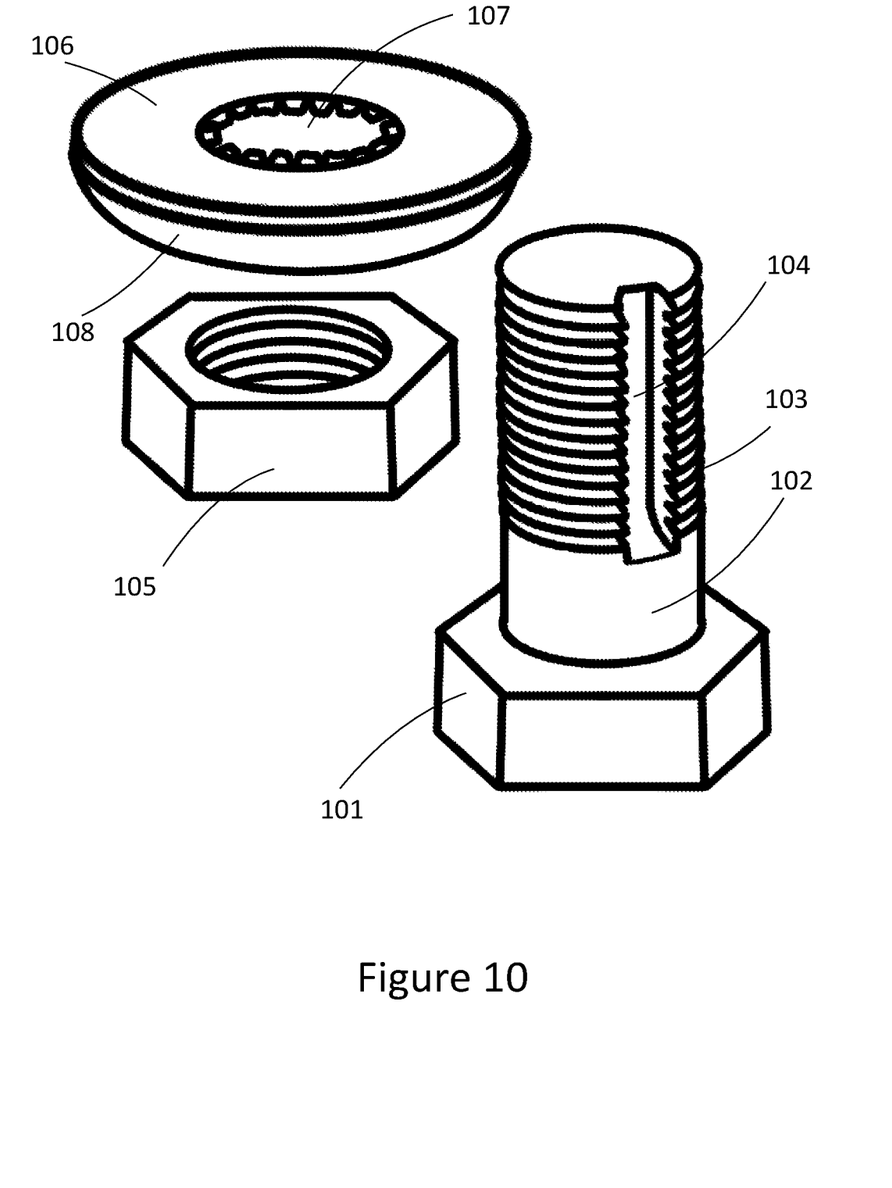
FIG. 10 shows a design option of a security washer with shank-locking means and nut-gripping means in the form of a moldable interface.

FIG. 10 exhibits a security washer design option in which said nut-gripping means comprises a moldable interface 108 (FIG. 10) that has predetermined dimensions and also hardens within a predetermined period of time after it is exposed to air or a predetermined chemical, and said shank-locking means comprise a serrated inner opening 107 (FIG. 10) that is smaller in diameter than said shank 102 (FIG. 10) by a predetermined margin and has predetermined elasticity. When said nut 105 (FIG. 10) is screwed onto said shank 102 (FIG. 10) of said bolt 101 (FIG. 10), said security washer 106 (FIG. 10) is pushed down said shank 102 (FIG. 10) onto said nut 105 (FIG. 10). As described previously, said serrated inner opening 107 (FIG. 10) unidirectionally grabs hold of said male thread 103 (FIG. 10) with a part of said serrated inner opening 107 (FIG. 10) gripping into said at least one longitudinal groove 104 (FIG. 10) to prevent said security washer 106 (FIG. 10) from moving on said shank 102 (FIG. 10). Said moldable interface 108 (FIG. 10) is pressed onto said nut 105 (FIG. 10) and forms a hardened mold over said nut 105 (FIG. 10) to prevent said nut 105 (FIG. 10) from moving.

Figure 11:
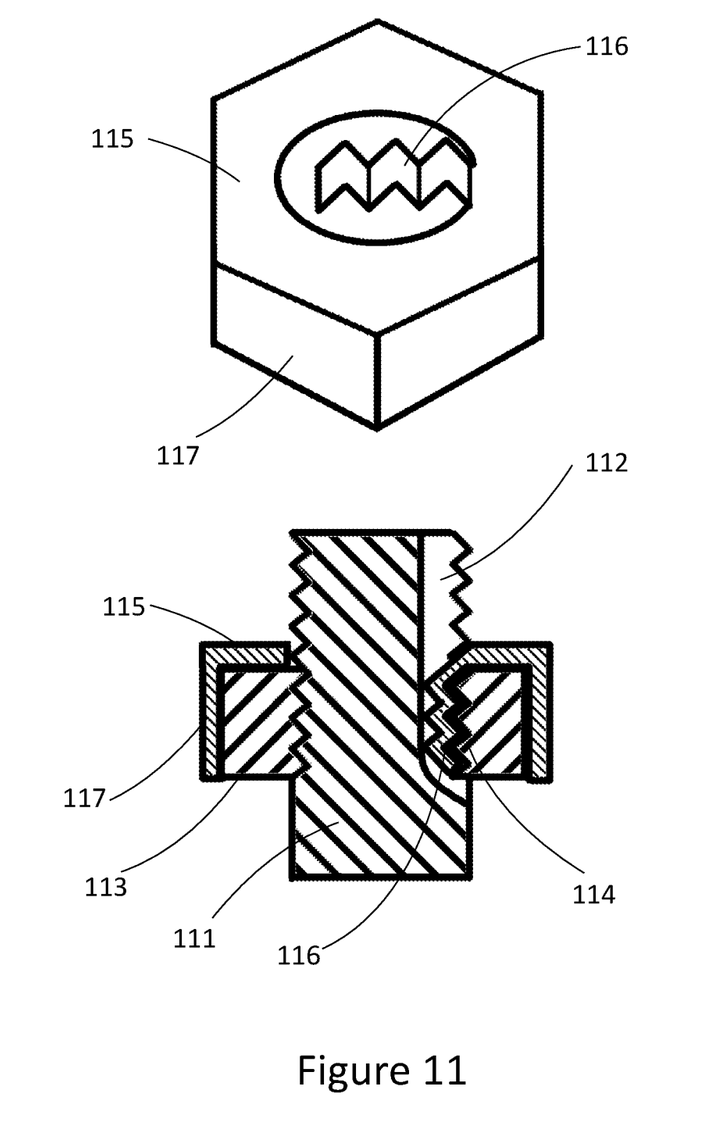
FIG. 11 explains an alternative design option of a security washer with shank-locking means in the form of a zig-zag structure.

FIG. 11 elaborates a security washer design option in which said security washer 115 (FIG. 11) comprises a pre-formed sleeve 117 (FIG. 11) to encompass a nut, and said shank-locking means comprises a zig-zag structure 116 (FIG. 11) of predetermined dimensions and predetermined elasticity. Said zig-zag structure 116 (FIG. 11) in the top graph is shown in a horizontal position for illustration purposes, whereas it is bended downward in real applications. As shown in FIG. 11, said washer-groove means comprises at least one longitudinal groove 112 (FIG. 11) on said shank 111 (FIG. 11). With its predetermined dimensions and predetermined elasticity, preferably said zig-zag structure 116 (FIG. 11) fits in said at least one longitudinal groove 112 (FIG. 11) to geometrically form a substantially circular cross section of said shank 111 (FIG. 11), so that said zig-zag structure 116 (FIG. 11) easily grabs hold of said female thread 114 (FIG. 11) of said nut 113 (FIG. 11) and said security washer 115 (FIG. 11) will be unable to move on said shank 111 (FIG. 11). It is important to note that the dimensions of said zig-zag structure 116 (FIG. 11) can be somewhat different from what is exactly needed to geometrically form a circular cross section of said shank 111 (FIG. 11) thanks to its predetermined dimensions and predetermined elasticity, in order to grab hold of said female thread 114 (FIG. 11). When said nut 113 (FIG. 11) is screwed onto said shank 111 (FIG. 11), said security washer 115 (FIG. 11) is pushed down said shank 111 (FIG. 11) onto said nut 113 (FIG. 11). Said zig-zag structure 116 (FIG. 11) goes into said at least one longitudinal groove 112 (FIG. 11) and consequently grabs hold of said female thread 114 (FIG. 11) to secure said security washer 115 (FIG. 11) on said nut 113 (FIG. 11) and said zig-zag structure 116 (FIG. 11) also prevents said security washer 115 (FIG. 11) from moving on said shank 111 (FIG. 11). As shown in FIG. 11, said pre-formed sleeve 117 (FIG. 11) of predetermined dimensions encompasses said nut 113 (FIG. 11) to prevent said nut 113 (FIG. 11) from moving.

My invention offers at least three significant advantages over the current designs. The first advantage is that the anti-loosening joint is permanent and will not become loose over time. The second advantage is that all design approaches can be applied in tight spaces in which drilling a hole through the shank of a bolt after the nut is screwed on is not feasible (For example, such a drilling process is required in the case of castellated nuts). The third advantage is that some design options can easily be retro-fitted to all existing bolt/nut joints without removing or replacing the existing bolts and nuts. For instance, the third design approach would only require two simple steps for retro-fitting: (1) grinding a groove in the shank of a bolt and (2) applying a security washer that is suitable for the situation on hand.

The foregoing description of my invention, including the accompanying drawings, is related only to some of the exemplary, preferred embodiments, and selected applications of this invention, while its true scope, as set forth in the claims listed below, is intended to include all possible or plausible applications, configurations, options, modifications, and embodiments, and is not limited to those of the examples, applications, configurations, options, embodiments, and functions described above. Similarly, said drawings shall be considered as illustrative in nature and shall not be interpreted to be as restrictive as graphically depicted, and the configurations, options, features, functionalities that are shown in said drawings and/or are described above can be combined in a design, application, or embodiment as needed. As being illustrative in nature, said drawings and their contents may not be necessarily proportional or true to scale.

I claim:

1. An apparatus for anti-loosening joints, comprising:
   a. a bolt comprising a shank having a male thread and pin-groove means for preventing at least one elongated filler pin of predetermined dimensions from moving on said shank,
   b. a nut comprising a female thread compatible with said male thread and at least one slot or at least one flat face,
   c. said at least one elongated filler pin being bendable and able to retain its bended shape to fit into said pin-groove means, and further said at least one elongated filler pin comprising thread-locking means for grabbing hold of said female thread and nut-locking means for gripping said nut, and
   d. said nut being screwed onto said bolt, said pin-groove means preventing said at least one elongated filler pin from moving on said shank, said thread-locking means grabbing hold of said female thread for said at least one elongated filler pin to be secured in place, and said nut-locking means gripping said nut to prevent said nut from moving on said shank,
   whereby said anti-loosening joints will be achieved.

2. The apparatus of claim 1 wherein said pin-groove means comprises at least one longitudinal groove of predetermined dimensions on said shank, said nut comprises at least one slot or at least one flat face, and further said thread-locking means comprises a zig-zag structure of predetermined dimensions and predetermined elasticity, and furthermore said nut-locking means comprises a part of said at least one elongated filler pin that is pre-bent or is bendable and able to retain its bended shape to fit into said at least one slot or to fit closely said at least one flat face.

3. The apparatus of claim 1 wherein said pin-groove means comprises at least one longitudinal groove of predetermined dimensions on said shank, said nut comprises at least one slot or at least one flat face, and further said thread-locking means comprises a zig-zag structure of predetermined dimensions and predetermined elasticity, and furthermore said nut-locking means comprises a part of said at least one elongated filler pin that is pre-bent or is bendable and able to retain its bended shape to fit into said at least one slot or to fit closely said at least one flat face on said nut, and moreover said part of said at least one elongated filler pin comprises a bevel to help bend itself when pushed downward.

4. An apparatus for anti-loosening joints, comprising:
   a. a bolt comprising a shank having a male thread and shank-groove means for attaching to a nut,
   b. said nut comprising a female thread compatible with said male thread and groove-locking means for engaging said shank-groove means, and
   c. said nut being screwed onto said bolt, and said groove-locking means being bendable and able to retain its bended shape to engage said shank-groove means to prevent said nut from moving on said shank,
   whereby said anti-loosening joints will be achieved.

5. The apparatus of claim 4 wherein said shank-groove means comprises at least one longitudinal groove of predetermined dimensions on said shank, said groove-locking means comprises at least one flap of predetermined dimensions on said nut, and further said at least one flap or a part thereof is bendable and able to retain its bended shape when it is bent into said at least one longitudinal groove.

6. The apparatus of claim 4 wherein said shank-groove means comprises at least one longitudinal groove of predetermined dimensions on said shank, said groove-locking means comprises at least one flap of predetermined dimensions on said nut, and further said at least one flap or a part thereof is bendable and able to retain its bended shape when it is bent into said at least one longitudinal groove, and furthermore said at least one flap or said part thereof comprises a bevel that helps bend itself when pushed downward.

7. An apparatus for anti-loosening joints, comprising:
   a. a bolt comprising a shank having a male thread and washer-groove means for preventing a security washer of predetermined dimensions from moving on said shank,
   b. a nut comprising a female thread compatible with said male thread,
   c. said security washer comprising shank-locking means with a serrated inner opening for being secured on said shank or on said nut and as-needed nut-gripping means with a pre-formed structure for attaching to said nut, and
   d. said nut being screwed onto said bolt, said security washer being pushed down said shank onto said nut, said shank-locking means gripping into said male thread or said female thread and also engaging said washer-groove means to prevent said security washer from moving on said shank, and, as each intended application dictates, said as-needed nut-gripping means attaching firmly onto said nut to prevent said nut from moving, whereby said anti-loosening joints will be achieved.

8. The apparatus of claim 7 wherein said washer-groove means comprises at least one longitudinal groove of predetermined dimensions on said shank, said shank-locking means comprises a serrated inner opening that has predetermined elasticity and is smaller in diameter than said shank by a predetermined margin, and further, when said security washer is pushed down said shank onto said nut, said serrated inner opening unidirectionally grabs hold of said male thread with a part of said serrated inner opening gripping into said at least one longitudinal groove to prevent said security washer from moving on said shank.

9. The apparatus of claim 7 wherein said nut comprises at least one flat face, and said nut-gripping means comprises a pre-formed structure of predetermined dimensions to fit closely said at least one flat face of said nut, and further, when said security washer is pushed down said shank onto said nut, said pre-formed structure fits closely said at least one flat face of said nut to prevent said nut from moving.

10. The apparatus of claim 7 wherein said nut-gripping means comprises a pre-formed sleeve of predetermined dimensions to encompass said nut, and further, when said security washer is pushed down said shank onto said nut, said pre-formed sleeve encompasses said nut to prevent said nut from moving.

11. The apparatus of claim 7 wherein said nut-gripping means comprises an outer flange of predetermined dimensions, and further said outer flange or a part thereof is pre-bent or bendable and able to retain its bended shape, and furthermore, when said security washer is pushed down said shank onto said nut, said outer flange or said part thereof presses or is bended to press onto said nut to prevent said nut from moving.

12. The apparatus of claim 7 wherein said nut comprises at least one slot and said nut-gripping means comprises at least one protruding ridge to mesh into said at least one slot on said nut, and furthermore, when said security washer is pushed down said shank onto said nut, said at least one protruding ridge meshes into said at least one slot to prevent said nut from moving.

13. The apparatus of claim 7 wherein said nut-gripping means comprises a glue, sticky, or adhesive interface of predetermined dimensions, and further, when said security washer is pushed down said shank onto said nut, said interface securely sticks to said nut to prevent said nut from moving.

14. The apparatus of claim 7 wherein said nut-gripping means comprises a moldable interface of predetermined dimensions, and further said moldable interface hardens after a predetermined period of time naturally or after said moldable interface is exposed to air, water, or a predetermined chemical, and furthermore, when said security washer is pushed down said shank onto said nut, said moldable interface forms a hardened mold over said nut to prevent said nut from moving.

15. The apparatus of claim 7 wherein said nut comprises at least one flat face, said washer-groove means comprises at least one longitudinal groove of predetermined dimensions on said shank, said shank-locking means comprises a serrated inner opening that has predetermined elasticity and is smaller in diameter than said shank by a predetermined margin, and further said nut-gripping means comprises a pre-formed structure of predetermined dimensions to fit closely said at least one flat face of said nut, and furthermore, when said security washer is pushed down said shank onto said nut, said serrated inner opening unidirectionally grabs hold of said male thread with a part of said serrated inner opening gripping into said at least one longitudinal groove to prevent said security washer from moving on said shank and said pre-formed structure fits closely said at least one flat face of said nut to prevent said nut from moving.

16. The apparatus of claim 7 wherein said washer-groove means comprises at least one longitudinal groove of predetermined dimensions on said shank, said shank-locking means comprises a serrated inner opening that has predetermined elasticity and is smaller in diameter than said shank by a predetermined margin, and further said nut-gripping means comprises a pre-formed sleeve of predetermined dimensions to encompass said nut, and furthermore, when said security washer is pushed down said shank onto said nut, said serrated inner opening unidirectionally grabs hold of said male thread with a part of said serrated inner opening gripping into said at least one longitudinal groove to prevent said security washer from moving on said shank and said pre-formed sleeve encompasses said nut to prevent said nut from moving.

17. The apparatus of claim 7 wherein said washer-groove means comprises at least one longitudinal groove of predetermined dimensions on said shank, said shank-locking means comprises a serrated inner opening that has predetermined elasticity and is smaller in diameter than said shank by a predetermined margin, and further said nut-gripping means comprises an outer flange of predetermined dimensions and said outer flange or a part thereof pre-bent or is bendable and able to retain its bended shape, and furthermore, when said security washer is pushed down said shank onto said nut, said serrated inner opening unidirectionally grabs hold of said male thread with a part of said serrated inner opening gripping into said at least one longitudinal groove to prevent said security washer from moving on said shank and said outer flange or said part thereof presses or is bended to press onto said nut to prevent said nut from moving.

18. The apparatus of claim 7 wherein said washer-groove means comprises at least one longitudinal groove of predetermined dimensions on said shank, said shank-locking means comprises a serrated inner opening that has predetermined elasticity and is smaller in diameter than said shank by a predetermined margin, and further said nut comprises at least one slot and said nut-gripping means comprises at least one protruding ridge to mesh into said at least one slot on said nut, and furthermore, when said security washer is pushed down said shank onto said nut, said serrated inner opening unidirectionally grabs hold of said male thread with a part of said serrated inner opening gripping into said at least one longitudinal groove to prevent said security washer from moving on said shank and said at least one protruding ridge meshes into said at least one slot to prevent said nut from moving.

19. The apparatus of claim 7 wherein said washer-groove means comprises at least one longitudinal groove of predetermined dimensions on said shank, said shank-locking means comprises a serrated inner opening that has predetermined elasticity and is smaller in diameter than said shank by a predetermined margin, and further said nut-gripping means comprises a glue, sticky, or adhesive interface of predetermined dimensions, and furthermore, when said security washer is pushed down said shank onto said nut, said serrated inner opening unidirectionally grabs hold of said male thread with a part of said serrated inner opening gripping into said at least one longitudinal groove to prevent said security washer from moving on said shank and said interface securely sticks to said nut to prevent said nut from moving.

20. The apparatus of claim 7 wherein said washer-groove means comprises at least one longitudinal groove of predetermined dimensions on said shank, said shank-locking means comprises a serrated inner opening that has predetermined elasticity and is smaller in diameter than said shank by a predetermined margin, and further said nut-gripping means comprises a moldable interface of predetermined dimensions and said moldable interface hardens after a predetermined period of time naturally or after said moldable interface is exposed to air, water, or a predetermined chemical, and furthermore, when said security washer is pushed down said shank onto said nut, said serrated inner opening unidirectionally grabs hold of said male thread with a part of said serrated inner opening gripping into said at least one longitudinal groove to prevent said security washer from moving on said shank and said moldable interface forms a hardened mold over said nut to prevent said nut from moving.

21. The apparatus of claim 7 wherein said washer-groove means comprises at least one longitudinal groove of predetermined dimensions on said shank, said shank-locking means comprises a zig-zag structure of predetermined dimensions and predetermined elasticity, and further, when said security washer is pushed down said shank onto said nut, said zig-zag structure goes into said at least one longitudinal groove and grabs hold of said female thread to secure said security washer on said nut and to prevent said security washer from moving on said shank.

\* \* \* \* \*